US009306209B2

(12) United States Patent
Cho et al.

(10) Patent No.: US 9,306,209 B2
(45) Date of Patent: Apr. 5, 2016

(54) METHOD OF PREPARING NEGATIVE ACTIVE MATERIAL CONTAINING A CARBON-COATED SILICON CORE FOR A RECHARGEABLE LITHIUM BATTERY AND A RECHARGEABLE LITHIUM BATTERY

(75) Inventors: Jaephil Cho, Ulsan (KR); Min-Ho Seo, Daegu (KR); Mi-Hee Park, Gyeongsangnam-do (KR); Hye-Jung Kim, Ulsan-si (KR); Ki-Tae Kim, Daejeon (KR); Je-Young Kim, Daejeon (KR)

(73) Assignees: ULSAN National Institute of Science and Technology (KR); LG Chem, Ltd. (KR)

( * ) Notice: Subject to any disclaimer, the term of this patent is extended or adjusted under 35 U.S.C. 154(b) by 677 days.

(21) Appl. No.: 13/006,921

(22) Filed: Jan. 14, 2011

(65) Prior Publication Data

US 2011/0256452 A1    Oct. 20, 2011

(30) Foreign Application Priority Data

Apr. 19, 2010    (KR) .................. 10-2010-0036079

(51) Int. Cl.
| | |
|---|---|
| H01M 4/04 | (2006.01) |
| H01M 4/36 | (2006.01) |
| H01M 4/38 | (2006.01) |
| H01M 4/62 | (2006.01) |
| H01M 4/134 | (2010.01) |

(52) U.S. Cl.
CPC ............ *H01M 4/0471* (2013.01); *H01M 4/366* (2013.01); *H01M 4/38* (2013.01); *H01M 4/625* (2013.01); *H01M 4/134* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 6,413,489 | B1 * | 7/2002 | Ying et al. | 423/600 |
| 6,706,795 | B1 * | 3/2004 | Garti et al. | 524/431 |
| 2009/0236563 | A1 * | 9/2009 | Goan | C09C 1/00 |
| | | | | 252/500 |
| 2011/0165468 | A1 * | 7/2011 | Alias et al. | 429/231.8 |
| 2011/0200874 | A1 * | 8/2011 | Ono et al. | 429/213 |

FOREIGN PATENT DOCUMENTS

| | | |
|---|---|---|
| JP | 2004-047404 A | 2/2004 |
| JP | 2004327190 A | 11/2004 |
| JP | 2008-153117 A | 7/2008 |

(Continued)

OTHER PUBLICATIONS

Kim, H. et al., Three-Dimensional Porous Silicon Particles for Use in High-Performance Lithium Secondary Batteries, Angew. Chem. Int. Ed. Eng. Jan. 2005, vol. 47, No. 52, 10151-10154.

YuHong Xu etc., Nanosized core/shell silicon@carbon anode material for lithium ion batteries with polyvinylidene fluoride as carbon source; Materials Chemistry: Apr. 4, 2010, vol. 20 Issue 16, pp. 3216-3220.

(Continued)

*Primary Examiner* — Ula C Ruddock
*Assistant Examiner* — Tony Chuo
(74) *Attorney, Agent, or Firm* — Lerner, David, Littenberg, Krumholz & Mentlik, LLP

(57) ABSTRACT

The present invention provides a method of preparing a negative active material for a rechargeable lithium battery, comprising the steps of: mixing a silicon precursor, a surfactant comprising an ammonium halide salt having a organic group, an initiator, and a solvent; heat-treating the mixture; cooling the heat-treated mixture to room temperature; washing the cooled, heat treated mixture; and calcining the washed product.

13 Claims, 7 Drawing Sheets

(56) References Cited

FOREIGN PATENT DOCUMENTS

| | | | | |
|---|---|---|---|---|
| KR | 1020110080367 A | 7/2011 | | |
| WO | WO 99/59218 | * 11/1999 | ............ | H01M 10/40 |
| WO | 2007-094240 A1 | 8/2007 | | |
| WO | 2008-114532 A1 | 9/2008 | | |
| WO | WO 2010/029135 A2 | * 3/2010 | ............ | C04B 35/628 |
| WO | WO 2010/038609 A1 | * 4/2010 | .............. | H01M 4/58 |

OTHER PUBLICATIONS

Kim, Hyejung et al., "A Critical Size of Silicon Nano-Anodes for Lithium Rechargeable Batteries," Angew. Chem. Int. Ed. 2010, 49, 2146-2149.

* cited by examiner

METHOD OF PREPARING NEGATIVE ACTIVE MATERIAL CONTAINING A CARBON-COATED SILICON CORE FOR A RECHARGEABLE LITHIUM BATTERY AND A RECHARGEABLE LITHIUM BATTERY

CROSS-REFERENCE TO RELATED APPLICATION

The present application claims priority to and the benefit of Korean Patent Application No. 2010-0036079, filed in the Korean Intellectual Property Office on Apr. 19, 2010, the entire content of which is incorporated herein by reference.

BACKGROUND OF THE INVENTION

The present invention relates to a method of preparing a negative active material for a rechargeable lithium battery and a rechargeable lithium battery.

A battery is a device for generating electrical power by using materials which can react electrochemically in positive and negative electrodes. As a representative example of a battery, there is a rechargeable lithium battery that generates electrical energy by the change in chemical potential when lithium ions are intercalated/deintercalated in positive and negative electrodes.

The rechargeable lithium battery can be prepared by using materials which can intercalate/deintercalate lithium ions reversibly as a positive active material and a negative active material, and by filling the space between the positive electrode and the negative electrode with an organic electrolyte or a polymeric electrolyte.

Lithium-metal complex compounds have been used as the positive active material of a rechargeable lithium battery, for example, the lithium-metal complex oxides such as $LiCoO_2$, $LiMn_2O_4$, $LiNiO_2$, $LiNi_{1-x}Co_xO_2 (0<x<1)$, $LiMnO_2$, and the like.

Various types of carbon-based materials which can intercalate/deintercalate lithium, such as artificial graphite, natural graphite, hard carbon, and the like, have been used as the negative active material of the rechargeable lithium battery. Among the carbon-based materials, graphite has been the most widely used as the negative active material. Graphite provides an advantage in energy density of the lithium battery and secures long life of the rechargeable lithium battery with its excellent reversibility. This is because negative active materials comprised of graphite have a low discharge voltage of −0.2V, wherein negative active materials comprised of lithium have a low discharge voltage of 3.6V. However, the graphite active material has a disadvantage of low capacity in view of energy density per unit volume of the electrode because graphite has a very low density of about 1.6 g/cc when prepared into an electrode.

Recently, there have been ongoing studies to find alternative high capacity negative active materials other than the widely used graphite.

SUMMARY OF THE INVENTION

It is an aspect of the present invention to provide a method of preparing a negative active material for a rechargeable lithium battery that has uniform particle size, is well dispersed without agglomeration, and is superior in coulombic efficiency and life-cycle characteristics, while having high capacity.

It is another aspect of the present invention to provide a rechargeable lithium battery comprising a negative active material for a rechargeable lithium battery prepared by any one of the methods presented below.

According to one aspect of the present invention, a method of preparing a negative active material for a rechargeable lithium battery, comprise the steps of: mixing a silicon precursor, a surfactant comprising an ammonium halide salt having an organic group, an initiator, and a solvent; heat-treating the mixture; cooling the heat-treated mixture to room temperature; washing the cooled mixture; and calcining the washed product.

In one embodiment of the present invention, the ammonium halide salt may be represented by the following Chemical Formula 1:

Chemical Formula 1 wherein, $R^1$, $R^2$, $R^3$, and $R^4$ are the same or different from each other, and independently represent hydrogen, or a $C_1$-$C_{30}$ aliphatic organic group, and X is F, Cl, Br, or I.

In another embodiment, the heat-treated mixture comprises a reverse micelle structure, and the mixture may comprise 50 to 70 weight % of the silicon precursor, 5 to 20 weight % of the surfactant, 10 to 45 weight % of the initiator, and the remaining weight % of the solvent.

In yet another embodiment, the silicon precursor may comprise silicon halide, the initiator may comprise sodium naphthalide, and the solvent may comprise hexane, isopropyl alcohol, or a mixture thereof.

In one embodiment of the present invention, the step of heat treating the mixture may be carried out at the temperature of 300° C. to 500° C., and the washing process may be carried out by using hexane, water, or a mixture thereof. In another aspect of the present invention, the calcination step may be carried out at the temperature of 600° C. to 1000° C.

In yet another embodiment of the present invention, the method may further comprise the step of coating the surface of the calcined product with carbon.

In one embodiment of the present invention, the negative active material for a rechargeable lithium battery prepared by the method may comprise a core comprising silicon, and a coating layer comprising carbon on the surface of the core, wherein the particle diameter of the coated core may be 3 nm to 30 nm. In yet another embodiment, the particle diameter of the coated core may be 1 nm to 3 nm.

In one embodiment of the present invention, the silicon in the core of the negative active material prepared by the method may be crystalline and the carbon in the coating layer may be amorphous. The thickness of the coating layer may be 0.5 nm to 5 nm.

In another embodiment of the present invention, the negative active material for the rechargeable lithium battery may have a dispersity of 70% to 95%.

In yet another embodiment of the present invention, the rechargeable lithium battery, comprises: a negative electrode comprising the negative active material for the rechargeable lithium battery prepared by any one of the above methods mentioned or combinations thereof; a positive electrode comprising a positive active material; and an electrolyte.

Many other features, aspects, embodiments and advantages of the present invention are discussed in the following drawings and exemplary detailed description.

DETAILED DESCRIPTION OF THE EMBODIMENTS

Figure 1:
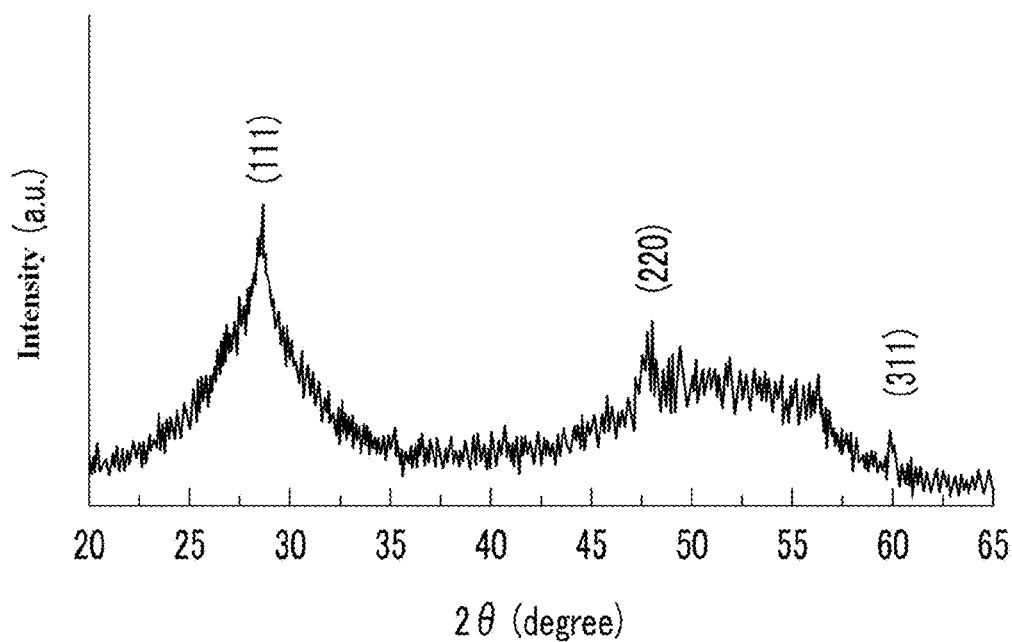
FIG. 1 is the X-ray diffraction analysis graph of the negative active material of the rechargeable lithium battery prepared in Example 1.

Hereinafter, embodiments of the invention are explained in more detail by referring to FIGS. 1-11 so that a person skilled in the art can carry out the invention easily. The following embodiments are presented as examples and the invention is not limited to or by them.

In FIGS. 1-11, the magnification is increased so as to illustrate many layers and areas clearly.

Throughout the specification, the term "above" is defined as not only immediately adjacent to another part, but may also be several layers above other parts. On the contrary, "just above" is defined as immediately adjacent to another part.

In one embodiment of the present invention, a method of preparing a negative active material for a rechargeable lithium battery, comprises the steps of: mixing a silicon precursor, a surfactant comprising an ammonium halide salt having a organic group, an initiator, and a solvent; heat-treating the mixture; cooling the heat-treated mixture to room temperature; washing the cooled mixture; and calcining the washed product.

The first step of one embodiment of the present invention comprises mixing a silicon precursor, a surfactant comprising the ammonium halide salt having a organic group, an initiator, and a solvent.

In one embodiment, the mixture may be prepared by: first, dissolving the silicon precursor and the surfactant into the solvent; second, mixing the initiator with a second solvent; third, combining the two mixtures together. The method of the present invention is not limited thereto.

In one embodiment of the present invention, a reverse micelle structure can be formed by heat-treating the mixture at a high temperature, or by heat-treating the mixture at a high temperature with high pressure. If either of these heat-treating methods are employed, the silicon is surrounded by the surfactant in the mixture and a reverse micelle structure may be formed, resulting in silicon particles that can exist in a well dispersed state, with uniform size, and without agglomeration.

In another aspect of the present invention, the length of the organic group can be adjusted to change the size of the silicon particle inside the reverse micelle structure. For example, the organic group can contain an long alkyl chain which binds to the surfactant, decreasing the size of the silicon particle inside the reverse micelle structure.

In yet another aspect of the present invention, it is possible to form the silicon particles having the desired size so that the particles are well dispersed without agglomeration.

The mixture may comprise about 50 to 70 weight % of the silicon precursor, about 5 to 20 weight % of the surfactant, about 10 to 45 weight % of the initiator, and the remaining weight % of the solvent. When the mixture comprises the constituents in these ranges, it is possible to form the reverse micelle structure effectively, and to form the silicon particles having a desired size effectively without agglomeration. Particularly, the mixture may comprise about 60 to about 70 weight % of the silicon precursor, about 10 to about 20 weight % of the surfactant, about 10 to about 30 weight % of the initiator, and the remaining weight % of the solvent.

In one embodiment of the present invention, the ammonium halide salt having an organic group that is included as the surfactant surrounds the silicon particle in the reverse micelle structure. This ammonium halide salt may be represented by the following Chemical Formula 1:

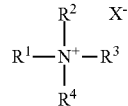

Chemical Formula 1 wherein, $R^1$, $R^2$, $R^3$, and $R^4$ are the same or different from each other, and independently represent hydrogen, or a $C_1$-$C_{30}$ aliphatic organic group, and X is F, Cl, Br, or I.

The silicon precursor provides the silicon in the reverse micelle structure. In one embodiment of the invention, the silicon precursor may comprise a silicon compound such as silicon halide. In another embodiment, the silicon precursor may be $SiCl_4$.

The initiator reacts with the silicon precursor and forms the silicon. In one embodiment, the initiator may comprise sodium naphthalide.

In another embodiment of the present invention, the solvent may comprise hexane, isopropyl alcohol, or a mixture thereof, or any solvent that can dissolve the constituents in the mixture.

In one aspect of the present invention, the mixture is subsequently heat-treated. By the heat-treatment, the components of the mixture react to each other, and the reverse micelle structure in which the silicon is included can be formed.

In one embodiment of the present invention, the heat-treatment can be carried out at a temperature of about 300° C.

to about 500° C. When the heat-treatment is carried out under this temperature range, the reverse micelle structure, in which the silicon is included, can be effectively formed. In another aspect of the present invention, the heat-treatment can be carried out at a temperature of about 300° C. to about 400° C.

In yet another embodiment, the heat-treatment may be carried out in an autoclave.

In one embodiment of the present invention the heat-treated product is subsequently cooled to room temperature. In one embodiment, room temperature is about 25° C.

When the heat-treated product is cooled to room temperature, the core comprising the silicon is formed inside the reverse micelle structure in the form of a particle, preventing agglomeration of the core.

In one embodiment of the present invention, the product cooled to room temperature may be washed. In one embodiment, the washing process may be carried out by using hexane, water, or a combination thereof. Side products such as naphthalene and NaCl, which are formed from the reaction of the initiator and the silicon precursor, can be eliminated by the washing process.

In one embodiment of the present invention, the washed mixture is subsequently calcined. The surfactants can be degraded by this calcination step. In one embodiment, carbon derived from the calcined reactants can form a coating layer on the surface of the silicon core particle.

In yet another embodiment, the calcination process may be carried out at a temperature of about 600° C. to about 1000° C. When the calcination is carried out in this temperature range, it is possible to degrade the surfactants effectively and form a coating layer comprising carbon on the surface of the silicon core. In yet another embodiment of the present invention, the calcination may be carried out at a temperature of about 600° C. to about 800° C.

In another embodiment of the present invention, the method of preparing a negative active material for a rechargeable lithium battery may further comprise the step of coating the surface of the calcined product with carbon.

In one embodiment, the coating of the calcined product with carbon may be carried out by treating the calcined product with a hydrocarbon gas. In another embodiment the hydrocarbon gas is used in the presence of an inert environment. In another embodiment, the treatment of the calcined product may occur in a vacuum under high temperature. In yet another embodiment, the hydrocarbon gas may be acetylene gas, the inert environment may be an argon environment, and the high temperature may be a temperature of about 500° C. to about 1000° C. However, the coating step with carbon is not limited to these embodiments and may be carried out by using different methods and materials.

According to the above methods of preparing the negative active material for a rechargeable lithium battery, it is possible to prepare the negative active material for the rechargeable lithium battery comprising a silicon core of uniform particle size and a carbon coating layer of uniform thickness on the surface of the silicon core without agglomeration by using a prescribed surfactant. Furthermore, even when the additional carbon coating layer is formed on the surface of the negative active material for the rechargeable lithium battery, it is possible to form the carbon coating layer with uniform thickness.

Hereinafter, the negative active material for the rechargeable lithium battery prepared by above method is explained in more detail.

The negative active material for a rechargeable lithium battery may comprise a core comprising silicon and a coating layer comprising carbon on the surface of the core. The particle diameter, specifically the average particle diameter, of the negative active material for this rechargeable lithium battery may be about 3 nm to about 30 nm.

Specifically, the negative active material for a rechargeable lithium battery may be formed to have a desired particle diameter in the range of about 3 nm to about 30 nm. The negative active material for the rechargeable lithium battery may be formed to have a deviation of about 2 nm or less from the desired particle diameter, and particularly to have a deviation of about 0.5 nm or less.

The negative active material for a rechargeable lithium battery can be formed without agglomeration and can be formed to contain a uniform particle diameter and a reverse micelle structure by using a prescribed surfactant. In one embodiment, the negative active material for a rechargeable lithium battery may be formed to have a deviation of about 2 nm or less from the desired particle diameter, and particularly to have a deviation of about 0.5 nm or less.

Employing any one of the methods above results in a fine negative active material for a rechargeable lithium battery without agglomeration, that which contains uniform particle diameter. Furthermore, when a carbon coating layer is additionally formed on the surface of the negative active material, it is possible to form the carbon coating layer uniformly. According to this, the negative active material for the rechargeable lithium battery can have high capacity due to the characteristics of silicon, and superior coulombic efficiency and life-cycle characteristics.

This invention results in significant improvement over the currently available silicon powders which cause significant agglomeration and have a average particle diameter exceeding about 30 nm. These currently available powders show a rapid capacity fading phenomenon and have poor life-cycle characteristics. Furthermore, it is impossible to coat the carbon uniformly on these currently available silicon powders because of the agglomeration. Therefore, improvement of life-cycle characteristics due to uniform coating cannot be expected.

The silicon in the core may be crystalline, and the core may further comprise $SiO_x$ (here, $0<x<2$) in addition to the silicon.

When the silicon core comprises both $SiO_x$ (here, $0<x<2$) and silicon, the $SiO_x$ (here, $0<x<2$) may comprise an amount of about 0.1 weight % to about 10 weight %, preferably about 0.2 weight % to about 5 weight %, based on the total weight of the silicon core.

Generally, silicon core can be oxidized and contaminated with $SiO_x$ (here, $0<x<2$). If the content if the SiOx is increased in the silicon core, the electrical connection is deteriorated. However, in the negative active material of the present invention, the coating layer comprising carbon can prevent oxidation of the silicon core and contamination with $SiO_x$.

The carbon in the coating layer may be amorphous. If the carbon in the coating layer is amorphous, it is possible to prevent the pulverization of the silicon core even when the volume of the silicon core is changed by intercalation/deintercalation of lithium, as well as prevent or reduce side reactions between the silicon and the electrolyte.

The coating layer may be formed on part of the core or the whole of the surface of the core.

The thickness of the coating layer may be about 0.5 nm to about 5 nm, preferably about 1 nm to about 4 nm. When the thickness of the coating layer is in this range, it is possible to prevent the pulverization of the silicon core effectively even when the volume of the silicon core is changed by intercalation/deintercalation of lithium, and it is possible to prevent or reduce the side reaction between the silicon and the electrolyte effectively.

The negative active material for a rechargeable lithium battery may comprise carbon in the amount of about 1 weight % to about 15 weight %, preferably about 2 weight % to about 10 weight %, of the total weight of the negative active material. When the amount of the carbon is in this range, it is possible to prevent the pulverization of the silicon core effectively even when the volume of the silicon core is changed by intercalation/deintercalation of lithium, and it is possible to prevent or reduce the side reaction between the silicon and the electrolyte effectively. In one embodiment, carbon comprises an amount of about 5 weight % to about 10 weight % of the total weight of the negative active material.

The BET surface area of the negative active material for a rechargeable lithium battery produced by any one of the methods of the present invention may be about 5 $m^2/g$ to about 50 $m^2/g$. When the BET surface area of the negative active material of the rechargeable lithium battery is in this range, side reactions with the electrolyte are decreased and the formation of non-conductive SEI (solid-electrolyte interface) can be reduced. Furthermore, coulombic efficiency and life-cycle characteristics are improved by reducing the amount of lithium that is irreversibly consumed by the formation of SEI. In one embodiment of the present invention, the BET surface area of the negative active material for a rechargeable lithium battery produced by any one of the methods of the present invention may be about 5 $m^2/g$ to about 15 $m^2/g$.

The negative active material for a rechargeable lithium battery produced by any one of the methods of the present invention can have uniform particle size and be dispersed well, while having high capacity and coulombic efficiency. For example, previously known silicon-based negative active materials show a dispersity below about 50% or about 30% and agglomeration of the particles. However, the particles of the negative active material produced by the present invention for a rechargeable lithium battery results in a dispersity of about 70% or more, preferably about 80% to about 95%, and more preferably about 85% to about 92%.

Dispersity of the negative active material may be measured by adding the negative active material in an organic solvent, dispersing the negative active material by using ultrasonic waves, and measuring the dispersity from a TEM photograph. The measurement is calculated by taking a prescribed number of the active materials, for example 120 particles, which are arbitrarily sampled from the TEM photograph, and calculating the ratio of non-agglomerated particles versus the total number of particles. The percentage of particles that are not agglomerated with other particles and of which the size can be clearly measured is calculated as the percent dispersity.

The negative active material for a rechargeable lithium battery of the present invention can reduce the capacity fading phenomenon or the deterioration of life-cycle characteristics, because each of the particles thereof are not agglomerated with each other and are dispersed well with uniform particle size.

The negative active material for a rechargeable lithium battery prepared according to any one of the embodiments of the present invention has uniform particle size, is dispersed well without agglomeration, has high capacity, and maintains excellent coulombic efficiency and life-cycle characteristics.

Hereinafter, the functions and the effects of the present invention are explained in more detail through the following examples of the invention. However, these examples are provided only for exemplifying the present invention, and do not limit the scope of the present invention.

EXAMPLES

Example 1

Preparation of a Negative Active Material for a Rechargeable Lithium Battery

A solution was prepared by dissolving 0.1 mol (anhydride, purity 99.999%) of $SiCl_4$ and 1.5 g octadecyl trimethylammoniumbromide (OTAB) in 150 ml of anhydrous tetrahydrofuran (THF). Subsequently, the solution was mixed with 25 ml of THF solution comprising 3 g of sodium naphthalenide. This mixture was poured in to a reactor. The pressure of the reactor was about 150 mTorr, and the temperature was elevated to 380° C. The mixture was maintained in the reactor under these conditions for one day. Subsequently, the reactor was cooled to room temperature and opened to the atmosphere. The side products of naphthalene and NaCl were eliminated by filtering the contents of the reactor and washing the contents with excess hexane and water many times. The final product was calcined with an argon stream in a tube furnace at 600° C. for 1 hour so as to degrade the surfactant. All of the experiments were carried out in a glove box having oxygen content below 20 ppm.

With this, the negative active material for the rechargeable lithium battery was prepared. The particle diameter of the prepared negative active material for the rechargeable lithium battery was 5 nm±0.4 nm.

Example 2

Preparation of a Half Cell

A slurry of the negative active material was prepared by mixing the negative active material for the rechargeable lithium battery prepared in Example 1, Super P carbon black, and a polyvinylidene fluoride binder (PVDF) with the weight ratio of 80:10:10 in N-methylpyrrolidone (NMP) solvent. The slurry was coated on a copper (Cu) foil having a thickness of 50 μm, dried at 150° C. for 20 minutes, and roll-pressed so as to prepare a negative electrode. The loaded amount of the negative active material was about 9 $mg/cm^2$, and 0.2 C (900 mA/g) coincided with 8.1 $mA/cm^2$.

A coin type half cell (2016 R-type half cell) was prepared in a glove box filled with helium by using the negative electrode, a lithium counter electrode, a microporous polyethylene separator, and an electrolyte. The electrolyte in which 1 M $LiPF_6$ was dissolved in a solvent comprising ethylene carbonate and dimethyl carbonate with the volume ratio of 50:50 was used.

Example 3

Preparation of the Negative Active Material for a Rechargeable Lithium Battery

The negative active material for a rechargeable lithium battery was prepared substantially according to the same method as in Example 1, except that dodecyl trimethylammoniumbromide (DTAB) was used. The particle diameter of the prepared negative active material for the rechargeable lithium battery was 10 nm±2 nm.

Example 4

Preparation of a Half Cell

The coin type half cell (2016 R-type half cell) was prepared substantially according to the same method as in Example 2, except that the negative active material prepared in Example 3 was used.

Example 5

Preparation of the Negative Active Material for a Rechargeable Lithium Battery

The negative active material for a rechargeable lithium battery was prepared by annealing the negative active material prepared in Example 3 at 900° C. for 3 hours. The particle diameter of the prepared negative active material for the rechargeable lithium battery was 20 nm±2 nm.

Example 6

Preparation of a Half Cell

A coin type half cell (2016 R-type half cell) was prepared substantially according to the same method as in Example 2, except that the negative active material prepared in Example 5 was used.

Comparative Example 1

Preparation of the Negative Active Material for a Rechargeable Lithium Battery

The negative active material for rechargeable lithium battery was prepared by purchasing a commercially available silicon powder (Nanotech Co.). The particle diameter of the prepared negative active material for the rechargeable lithium battery was 35 nm±2 nm.

Comparative Example 2

Preparation of a Half Cell

A coin-type half cell (2016 R-type half cell) was prepared substantially according to the same method as in Example 2, except that the negative active material of Comparative Example 1 was used.

EXPERIMENTAL EXAMPLES

Experimental Example 1

X-Ray Diffraction (XRD) Analysis

XRD analysis of the negative active materials for the rechargeable lithium batteries of Examples 1, 3, and 5 was carried out. The results are illustrated in FIGS. 1, 2, and 3, respectively.

Cu-Kα ray was used as the light source in the XRD analysis.

Figure 2:
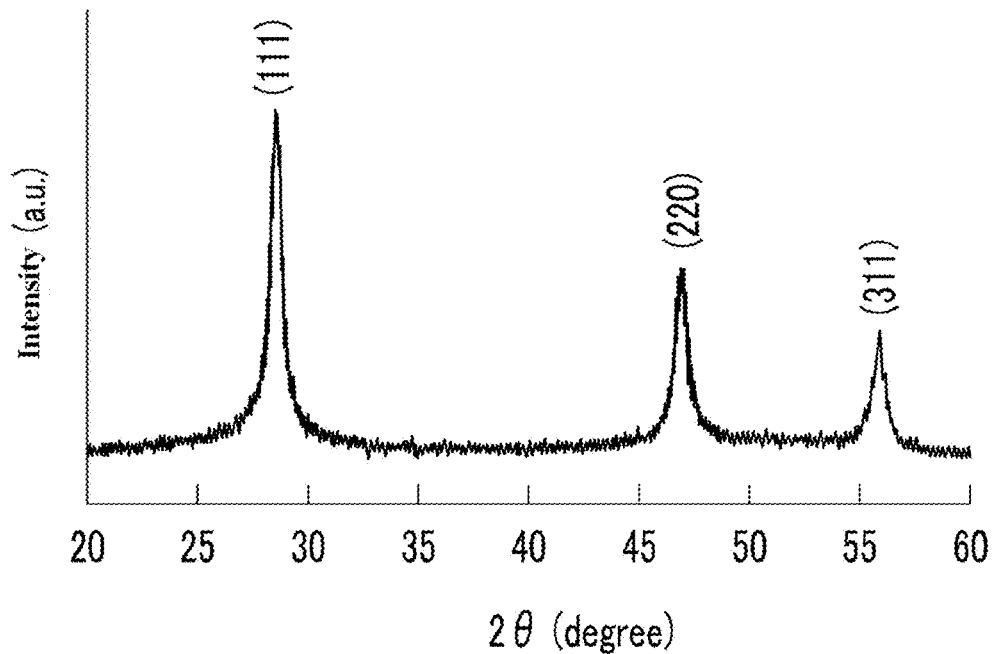
FIG. 2 is the X-ray diffraction analysis graph of the negative active material of the rechargeable lithium battery prepared in Example 3.
Figure 3:
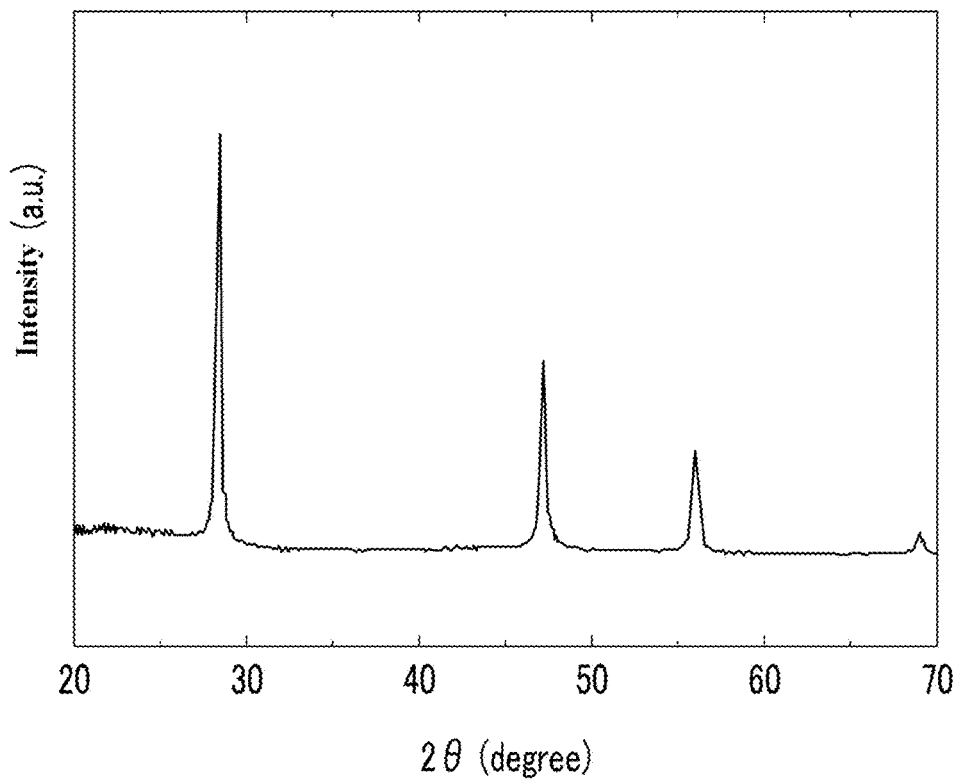
FIG. 3 is the X-ray diffraction analysis graph of the negative active material of the rechargeable lithium battery prepared in Example 5.

As demonstrated in FIGS. 1 to 3, diamond cubic phase was identified, and thus the negative active materials for the rechargeable lithium battery of Examples 1, 3, and 5 comprise a crystalline silicon core.

Experimental Example 2

Transmission Electron Microscope (TEM) Photograph and High Resolution Transmission Electron Microscope (HRTEM) Photograph The specimens were prepared by depositing the negative active materials for the rechargeable lithium battery prepared according to Examples 1, 3, and 5 on copper grids coated with carbon, and TEM and HRTEM photographs of the cross-sections were taken. A field-emission transmission electron microscope (FE-TEM) 2010F (JEOL Co.) set to 200 kV was used.

Figure 4:
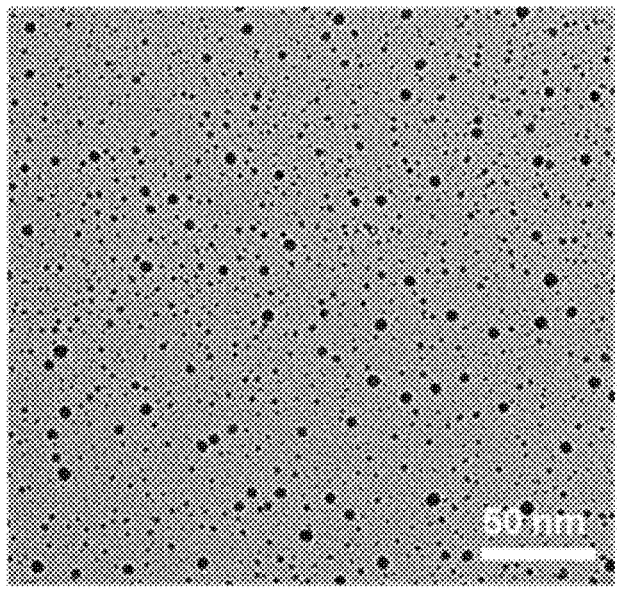
FIG. 4 is the TEM photograph of the negative active material of the rechargeable lithium battery prepared in Example 1.
Figure 5:
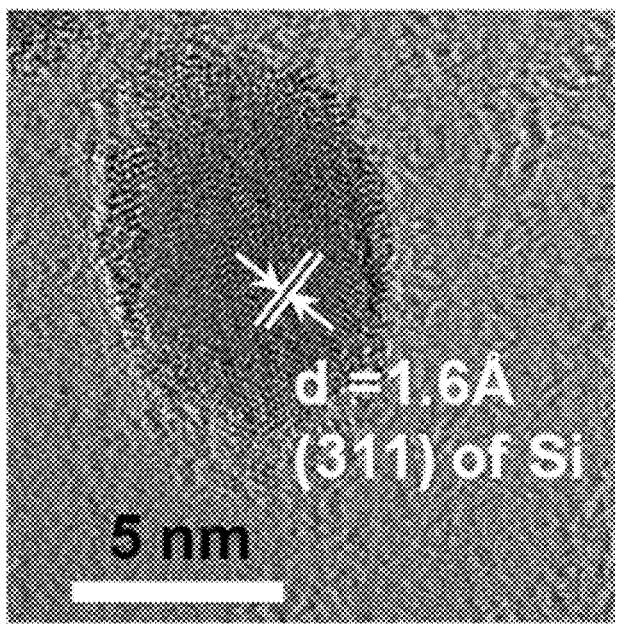
FIG. 5 is the HRTEM photograph of the negative active material of the rechargeable lithium battery prepared in Example 1.

The TEM photograph of the negative active material for the rechargeable lithium battery of Example 1 is represented as FIG. 4, and the HRTEM photograph is represented as FIG. 5.

Figure 6:
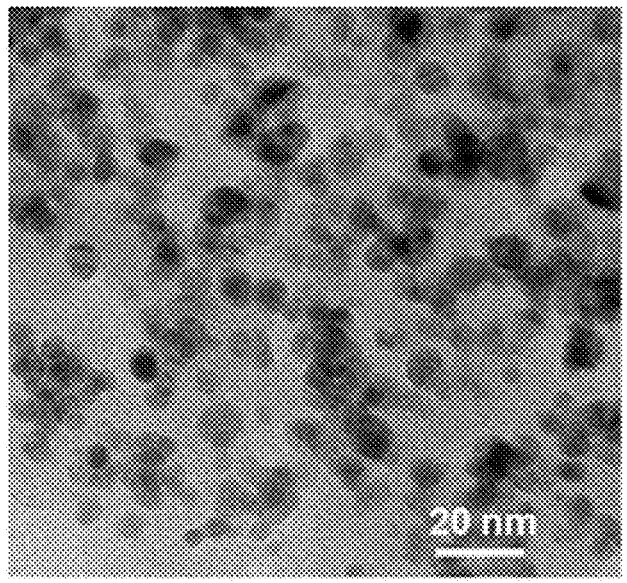
FIG. 6 is the TEM photograph of the negative active material of the rechargeable lithium battery prepared in Example 3.
Figure 7:
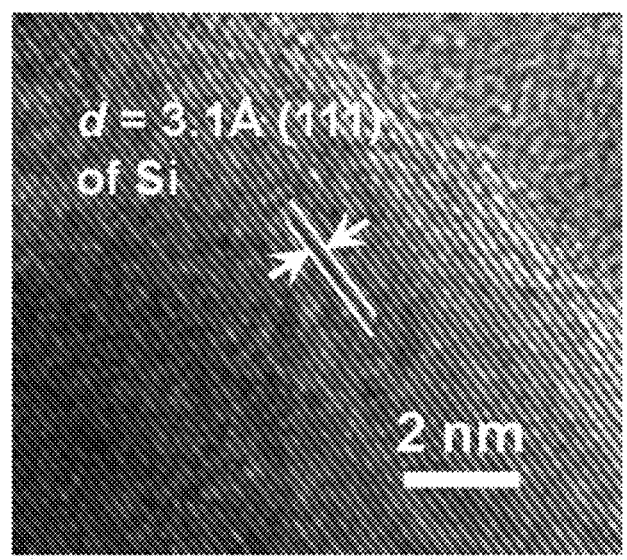
FIG. 7 is the HRTEM photograph of the negative active material of the rechargeable lithium battery prepared in Example 3.

The TEM photograph of the negative active material for the rechargeable lithium battery of Example 3 is represented as FIG. 6, and the HRTEM photograph is represented as FIG. 7.

Figure 8:
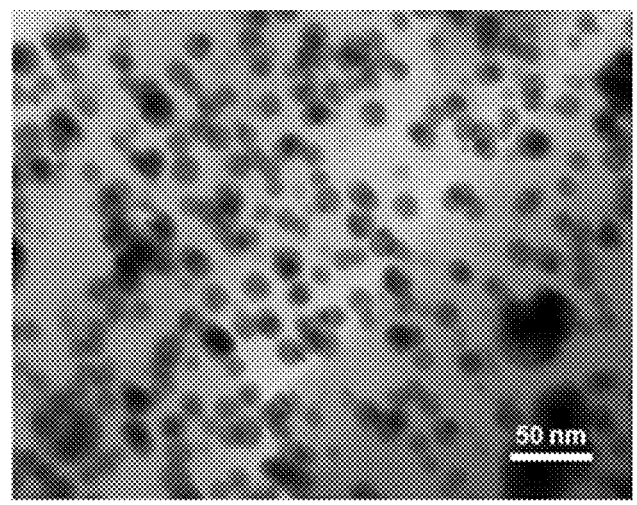
FIG. 8 is the TEM photograph of the negative active material of the rechargeable lithium battery prepared in Example 5.

The TEM photograph of the negative active material for the rechargeable lithium battery of Example 5 is represented as FIG. 8.

According to what is shown in FIG. 4, it can be recognized that the negative active materials for the rechargeable lithium battery prepared in Example 1 have a particle diameter of about 5 nm and they are uniformly dispersed.

According to what is shown in FIG. 5, the lattice fringe of the 311 face corresponds to the d-spacing value of a Si phase, 1.6 Å, and it can be recognized that the negative active materials for the rechargeable lithium battery prepared in Example 1 comprise a silicon phase.

According to what is shown in FIG. 6, it can be recognized that the negative active materials for the rechargeable lithium battery prepared in Example 3 have a particle diameter of about 10 nm and they are uniformly dispersed.

According to what is shown in FIG. 7, the lattice fringe of the 111 face corresponds to the d-spacing value of a diamond cubic Si phase, 3.1 Å, and it can be recognized that the negative active materials for the rechargeable lithium battery prepared in Example 3 comprise diamond cubic silicon phase.

According to what is shown in FIG. 8, it can be recognized that the negative active materials for the rechargeable lithium battery prepared in Example 5 have a particle diameter of about 20 nm and they are uniformly dispersed.

Furthermore, it is recognized from FIGS. 4 and 6 that the surfactant having a longer alkyl chain forms particles of smaller size.

Experimental Example 3

X-Ray Photoelectron Microscopy (XPS)

XPS analyses were carried out by using the negative active materials for the rechargeable lithium battery prepared in Examples 1 and 3. A K-Alpha spectrometer (Thermo Scientific Co.) that uses monochromatic Al Kα rays (1486.6 eV) as the light source was used.

Figure 9:
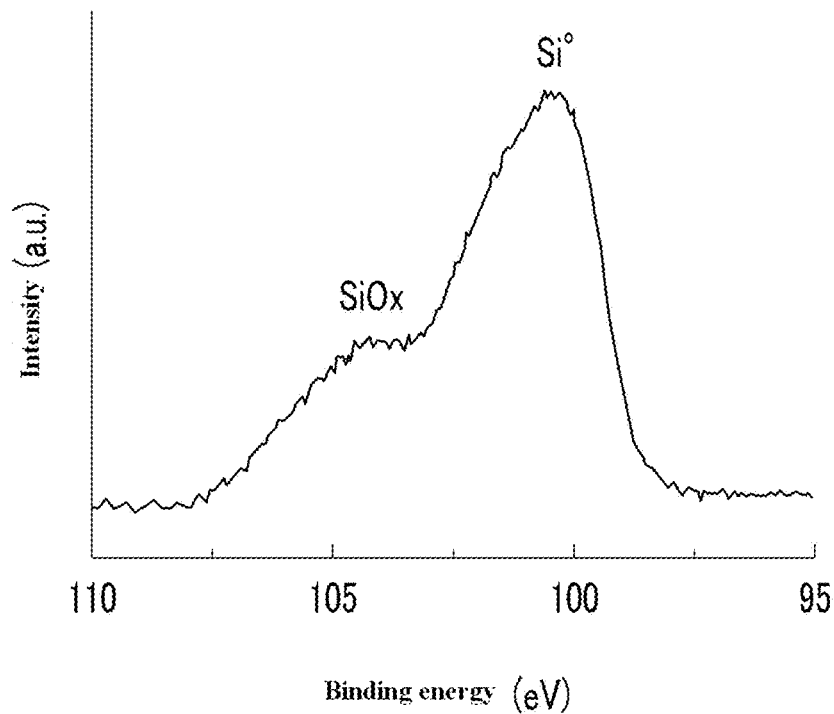
FIG. 9 is the XPS spectrum of the negative active material of the rechargeable lithium battery prepared in Example 1.
Figure 10:
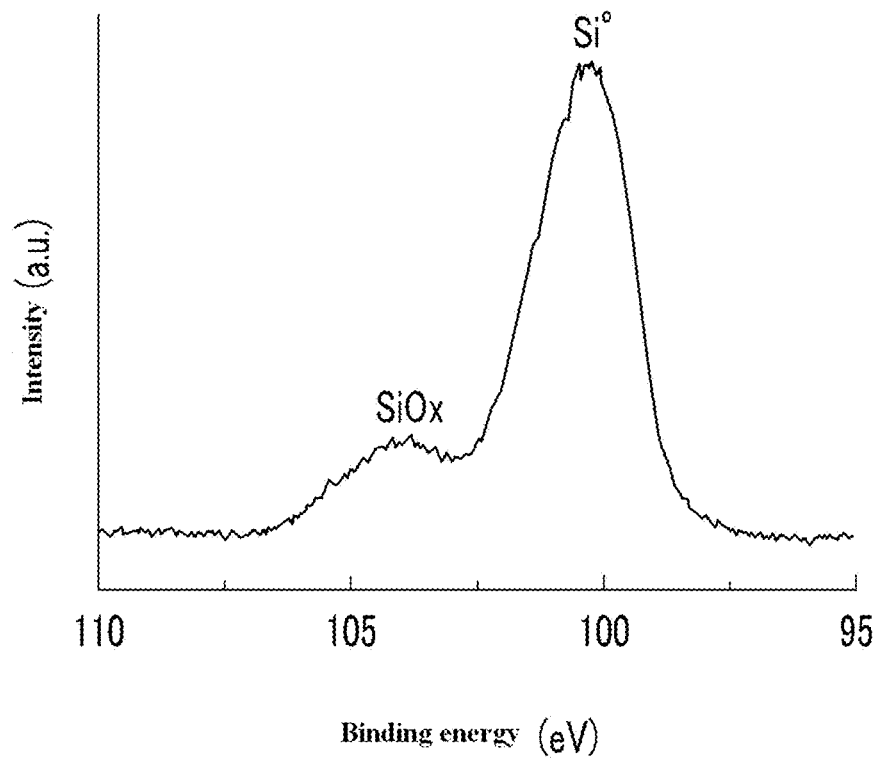
FIG. 10 is the XPS spectrum of the negative active material of the rechargeable lithium battery prepared in Example 3.

The results are illustrated in FIGS. 9 and 10.

According to the results demonstrated in FIG. 9, the negative active material for the rechargeable lithium battery prepared in Example 1 shows a strong peak at about 100 eV, demonstrating that the negative active material comprises metallic Si. In addition, these results indicate that the silicon comprises both the crystalline phase and the amorphous phase. Furthermore, the shoulder peak at about 104 eV indicates that $SiO_x$ (here, $0<x<2$) is comprised therein.

According to the results demonstrated in FIG. 10, the negative active material for the rechargeable lithium battery prepared in Example 3 shows a strong peak at about 100 eV, which indicates that the negative active material comprises metallic Si. In addition, these results indicate that the silicon comprises both the crystalline phase and the amorphous phase. Furthermore, the shoulder peak at about 104 eV indicates that $SiO_x$ (here, $0<x<2$) is comprised therein.

Generally, in the case of $SiO_2$, two dominant peaks are observed at 110 eV and 105 eV.

Comparing FIG. 9 and FIG. 10, the strength of the peak indicating $SiO_x$ (here, $0<x<2$) of the negative active material for the rechargeable lithium battery prepared in Example 3 is weaker than the strength of the peak indicating $SiO_x$ (here, $0<x<2$) of the negative active material for the rechargeable lithium battery prepared in Example 1.

These results demonstrate that the negative active material for the rechargeable lithium battery prepared in Example 3 comprises smaller $SiO_x$ (here, $0<x<2$) than the negative active material for rechargeable lithium battery prepared in Example 1. Therefore, the negative active material for the rechargeable lithium battery prepared in Example 3 may reduce the irreversible capacity and improve coulombic efficiency, because the degradation reactions from $SiO_x$ (here, $0<x<2$) to Si and $xLi_2O$ are diminished in this case.

Experimental Example 4

Measurement of Dispersity

The dispersity of the negative active materials for the rechargeable lithium battery of Examples 1 to 6 was measured according to the following method.

First, 10 mg of each of the negative active materials was added to 30 ml of hexane, and dispersed with ultrasonic waves for 10 minutes. Subsequently, a sample of the dispersion solution was arbitrarily extracted using a spuit and spread on the sample grid for TEM analysis. The sample was dried at room for 30 minutes, vacuumed with $10^{-7}$ torr, and photographed using TEM.

120 particles of each of the negative active materials were arbitrarily sampled from the TEM photograph, and the ratio of the number of the particles which were not agglomerated with the other particles and of which the size could be clearly measured among the 120 particles was calculated as the dispersity.

As the result of these measurements indicate, the negative active material of Example 1 (refer to the TEM photograph of FIG. 4) resulted in a dispersity of about 90%, and the negative active materials of Examples 2-6 resulted in a dispersity of about 92%.

Therefore, these results indicate that the negative active materials of Examples 1-6 have uniform particle size and are dispersed well.

Experimental Example 5

Measurements of Initial Charge Capacity, Initial Discharge Capacity, and Initial Coulombic Efficiency The first cycle charge/discharge was carried out in the half cells prepared in Examples 2, 4, and 6, and Comparative Example 2 at 0V to 1.5V with 0.2 C (900 mA/g), and the initial discharge capacity, the initial charge capacity, and the coulombic efficiency were measured.

The half cell prepared in Example 2 resulted in an initial discharge capacity of 4443 mAh/g, an initial charge capacity of 2649 mAh/g, and a coulombic efficiency of 60%.

The half cell prepared in Example 4 resulted in an initial discharge capacity of 4210 mAh/g, an initial charge capacity of 3380 mAh/g, and a coulombic efficiency of 80%.

The half cell prepared in Example 6 resulted in an initial discharge capacity of 4080 mAh/g, an initial charge capacity of 3467 mAh/g, and a coulombic efficiency of 85%.

The half cell prepared in Comparative Example 2 resulted in an initial discharge capacity of 3200 mAh/g, an initial charge capacity of 1900 mAh/g, and a coulombic efficiency of 59%.

These results demonstrate that the negative active materials for the rechargeable lithium battery prepared in Examples 1, 3, and 5 are superior in initial discharge capacity, initial charge capacity, and coulombic efficiency when compared to the negative active material for the rechargeable lithium battery prepared in Comparative Example 1.

As demonstrated above, the negative active materials prepared in Examples 1, 3, and 5 show superior properties due to the negative active materials comprising a fine silicon core with uniform particle diameter without agglomeration and uniform dispersity in the negative electrode.

The irreversible capacity decreases as the size of the particles increase because the surface area is decreased and thus the formation of non-conductive SEI due to side reactions of the silicon core and the electrolyte is decreased.

Experimental Example 6

Life-Cycle Characteristics

The variation of charge capacity was measured while carrying out charge/discharge of the half cells prepared in Examples 2, 4, and 6, and Comparative Example 2 at 0V to 1.5V with 0.2 C (900 mA/g). The results are shown in FIG. 11.

The variation of coulombic efficiency was measured while carrying out charge/discharge to the half cells prepared in Examples 2, 4, and 6 at 0V to 1.5V with 0.2 C (900 mA/g). The results are shown in FIG. 12.

Figure 11:
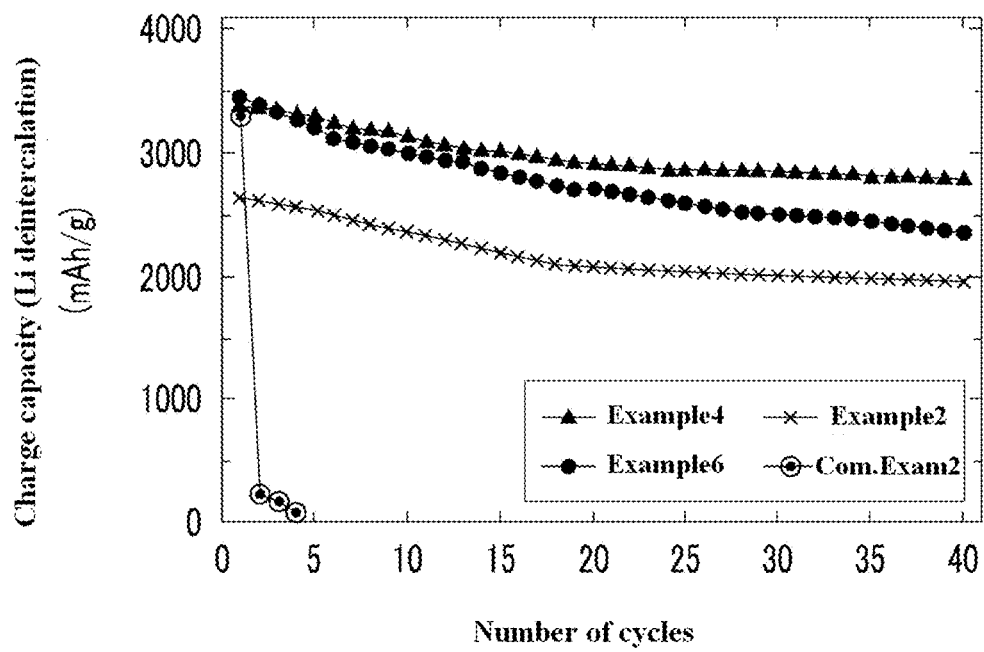
FIG. 11 is the graph showing the charge capacity versus the number of cycles of the half cells prepared in Examples 2, 4, and 6, and Comparative Example 2.

As the results demonstrate in FIG. 11, the negative active material for the rechargeable lithium battery of Example 1 resulted in a capacity retention ratio of 71%, the negative active material for the rechargeable lithium battery of Example 3 resulted in a capacity retention ratio of 81%, and the negative active material for the rechargeable lithium battery of Example 5 resulted in a capacity retention ratio of 67%, after 40 cycles of charge/discharge. The negative active material for the rechargeable lithium battery of Comparative Example 1 resulted in a retention ratio of 50%.

Figure 12:
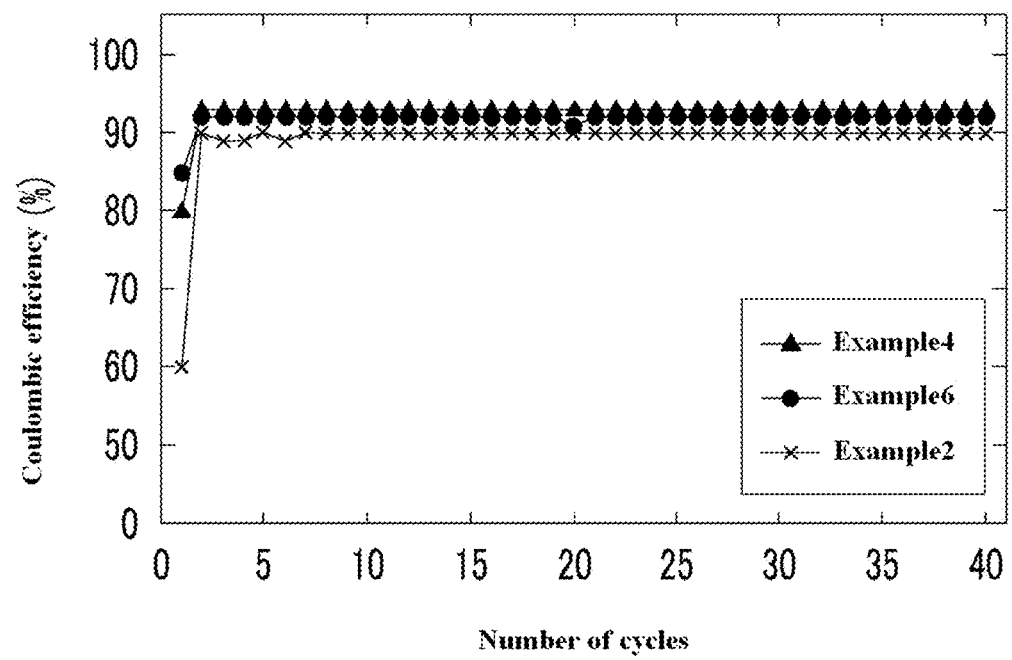
FIG. 12 is the graph showing the coulombic efficiency versus the number of cycles of the half cells prepared in Examples 2, 4, and 6.

As the results demonstrate in FIG. 12, the negative active material for the rechargeable lithium battery of Example 1 resulted in a coulombic efficiency of about 90%, the negative active material for the rechargeable lithium battery of Example 3 resulted in a coulombic efficiency of about 93%, and the negative active material for the rechargeable lithium battery of Example 5 resulted in a coulombic efficiency of about 92%, as charge/discharge proceeded.

These results demonstrate that the negative active material for a rechargeable lithium battery according to one embodiment of the present invention can achieve high capacity as well as effectively improve the life-cycle characteristics of the battery.

Referring to paragraph 0083, a negative electrode of a rechargeable lithium battery can be prepared using a negative active material of the subject invention (e.g., a negative active material of Example 1, 3, or 5 comprising a silicon core and a carbon coating layer) and carbon black. Also, the silicon core in the active material can be micronized during continuous charge and discharge of the lithium battery. However, even when the silicon core is micronized, the electrical connection can be maintained by the carbon black and carbon coating layer in the active material.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method of preparing a negative active material for a rechargeable lithium battery comprising the steps of:
   a) mixing a silicon precursor of silicon halide, a surfactant comprising an ammonium halide salt having an organic group, an initiator, and a solvent;
   b) heat-treating the mixture to form a reverse micelle structure in which silicon particles are surrounded by the surfactant;
   c) cooling the heat-treated mixture to room temperature;
   d) washing the cooled, heat-treated mixture; and
   e) calcining the washed product,
   wherein the negative active material for the rechargeable lithium battery has a particle diameter of 3 nm to 30 nm,
   wherein the negative active material for the rechargeable lithium battery comprises a core comprising silicon;
   wherein the surfactant is degraded by the calcination; and
   wherein carbon atoms derived from the calcined surfactant form a coating layer on the surface of the core.

2. The method according to claim 1, wherein the ammonium halide salt is represented by the following Chemical Formula 1:

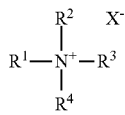

Chemical Formula 1 wherein,
$R^1, R^2, R^3$, and $R^4$ are the same or different from each other, and independently represent hydrogen, or a $C_1$-$C_{30}$ aliphatic organic group, and
X is F, Cl, Br, or I.

3. The method according to claim 1, wherein the mixture comprises 50 to 70 weight % of the silicon precursor, to 20 weight % of the surfactant, 10 to 45 weight % of the initiator, and the remaining weight % of the solvent.

4. The method according to claim 1, wherein the initiator is sodium naphthalide.

5. The method according to claim 1, wherein the solvent is hexane, isopropyl alcohol, or a mixture thereof.

6. The method according to claim 1, wherein the heat-treatment is carried out at the temperature of 300° C. to 500° C.

7. The method according to claim 1, wherein the washing process is carried out by using hexane, water, or a mixture thereof.

8. The method according to claim 1, wherein the calcination step is carried out at a temperature of 600° C. to 1000° C.

9. The method according to claim 1, further comprising the step of coating the surface of the calcined product with carbon.

10. The method according to claim 1, wherein the particle diameter has a deviation of 2 nm or less.

11. The method according to claim 1, wherein the silicon in the core is crystalline and the carbon in the coating layer is amorphous.

12. The method according to claim 1, wherein the coating layer has a thickness of 0.5 nm to 5 nm.

13. The method according to claim 1, wherein the negative active material for the rechargeable lithium battery has a dispersity of 70 to 95%.

* * * * *